United States Patent
Penders et al.

(10) Patent No.: US 11,178,845 B2
(45) Date of Patent: Nov. 23, 2021

(54) CHEESE RIPENING

(71) Applicant: FrieslandCampina Nederland B.V., Amersfoort (NL)

(72) Inventors: Johannes Antonius Penders, Wageningen (NL); Herman Frank Burghout, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 0 days.

(21) Appl. No.: 17/019,175

(22) Filed: Sep. 11, 2020

(65) Prior Publication Data
US 2020/0404880 A1    Dec. 31, 2020

Related U.S. Application Data

(63) Continuation of application No. PCT/EP2018/074738, filed on Sep. 13, 2018.

(30) Foreign Application Priority Data

Mar. 13, 2018  (EP) .................................. 18161414

(51) Int. Cl.
*A01J 27/02* (2006.01)
*A23C 19/16* (2006.01)

(52) U.S. Cl.
CPC ............ *A01J 27/02* (2013.01); *A23C 19/166* (2013.01)

(58) Field of Classification Search
CPC ......... A01J 27/02; A01J 27/045; A23C 19/16; A23C 19/166; A23C 19/14; A23C 19/163
See application file for complete search history.

(56) References Cited

U.S. PATENT DOCUMENTS 3,840,680 A * 10/1974 Schmidt et al. ........ B32B 27/00
                                                                   426/126
2002/0034622 A1* 3/2002 Edwards ................... B32B 7/12
                                                                   428/220

(Continued)

FOREIGN PATENT DOCUMENTS

EP    0 418 977 A1    3/1991
EP    2 052 625 A1    4/2009

(Continued)

OTHER PUBLICATIONS

International Search Report dated Jan. 3, 2019, received in corresponding International Application No. PCT/EP2018/074738, 4 pages.

*Primary Examiner* — Ericson M Lachica
(74) *Attorney, Agent, or Firm* — Foley & Lardner LLP; Sunit Talapatra

(57) ABSTRACT

A method for providing a naturally ripened, cylindrically shaped cheese of the hard or semi-hard type is provided. The method comprises: (i) forming a cylindrically shaped cheese from a curd by conventional means; (ii) applying a protective water-permeable coating layer onto the entire surface of the cheese, thereby obtaining a coated cheese; (iii) partially enclosing the coated cheese with a further coating of a water-impermeable material such that the convex, circumferential sides and the curved area are covered while leaving the flat bottom and top surfaces uncovered, thereby obtaining a partially enclosed coated cheese; and (iv) allowing the partially enclosed coated cheese to ripen. A naturally ripened, cylindrically shaped, coated cheese of the hard or semi-hard type obtainable by the method is also provided.

14 Claims, 2 Drawing Sheets

(56) References Cited

U.S. PATENT DOCUMENTS

| | | | | |
|---|---|---|---|---|
| 2005/0158442 A1* | 7/2005 | Westermann | .......... | B65D 75/68 |
| | | | | 426/582 |
| 2012/0064206 A1* | 3/2012 | Pennarun | ............. | A23C 19/163 |
| | | | | 426/307 |
| 2016/0165912 A1* | 6/2016 | Meijer | .................. | A23C 19/14 |
| | | | | 426/35 |
| 2016/0174587 A1* | 6/2016 | Meijer | ............... | A23C 19/0321 |
| | | | | 426/36 |

FOREIGN PATENT DOCUMENTS

| | | | | |
|---|---|---|---|---|
| EP | 2 186 417 | A2 | 5/2010 | |
| EP | 3 117 715 | A1 | 1/2017 | |
| GB | 0 813 737 | A | 5/1959 | |
| WO | WO-2017012953 | A1 * | 1/2017 | ........... A23C 19/166 |

* cited by examiner

CHEESE RIPENING

CROSS-REFERENCE TO RELATED APPLICATIONS

This application is a continuation of International Application No. PCT/EP2018/074738, filed Sep. 13, 2018, which claims the benefit of and priority to European Application No. 18161414.0 filed Mar. 13, 2018, both of which are hereby incorporated by reference herein in their entireties.

FIELD OF THE INVENTION

The invention relates to the field of cheesemaking. In particular, it relates to methods for providing a naturally ripened hard or semi-hard cheese, and to a ripened cheese obtainable by the method.

BACKGROUND TO THE INVENTION

In general, most cheesemaking operations include the steps of providing a cheesemaking media, inoculating the media with an acid-producing microorganism, and forming a coagulum. The coagulum is cut to provide curd and whey, whereupon the curd is separated from the whey and subsequently, the whey is drained from the curd. The curd is pressed and then packed into a suitable form to provide a cohesive mass which, upon some ripening, becomes a cheese. Variations in one or more of the above steps for producing cheese result in production of the many varieties of cheese which are known. For example, in the case of a semi-hard or hard type cheese like Gouda cheese, the curd is pressed in a cheese mould and then transferred to the brine. The cheeses are left to soak in the brine for a time interval in the order of days and are then transferred to the warehouse for further ripening. During the ripening of the cheese the organoleptic quality of the cheese is developed.

In a conventional ripening method of a semi-hard or hard cheese, after brining, the young cheese is ripened at about 13 to 18° C. at a relative humidity of 70 to 80%, typically to an age of minimally four weeks for a young cheese and a year or more for an old cheese. During this ripening, also referred to in the art as "standard ripening" or "natural ripening", the outside of the young cheese is provided with a conventional cheese covering means to protect the rind. Such cheese covering means typically is a coating of polyvinylacetate or some other water-permeable polymeric material, such as polysaccharides or polyethylene acetate. During the ripening process, the cheese loses moisture by water evaporation.

During natural ripening, the cylindrically shaped cheese is stored on (wooden) shelves. In the temperature and humidity controlled rooms where cheeses are aged, air naturally dries out the outside of cheese. Over time, this forms a crust on the outside of the cheese which becomes its rind. Cheesemakers monitor this process. The cheese is regularly turned, so that the upper and bottom sides are exposed to the air with intervals, while the "band" or circumference representing about 40% of the total surface area of the cheese, has no contact with the cheese shelves. This band area is continuously exposed to the air. As a consequence, the band area loses more water with the result that a dry and dark colored zone up to 7-8 mm or more e.g. 15-20 mm for an old cheese, and having an unattractive, chewy structure is formed.

EP-A-2 186 417 discloses a method for applying a semi-permeable coating to a cheese with variable coating layer thicknesses. Those surfaces of the cheese that show a higher moisture loss during ripening are provided with a thicker coating layer than the surfaces of the cheese having a lower moisture loss. The effect is a more uniform drying-in.

Alternatively, the young cheese is packaged in foil and is then ripened at a temperature of 4 to 7° C. to produce a rindless cheese of the semi-hard or hard type. This process is referred to as foil-ripening. A practical advantage is that a foil-ripened cheese, which is often of rectangular shape, gives no or hardly any cutting losses when cut to slices or bars. By comparison, the cutting loss with standard ripened cheese, also indicated with the term "naturally ripened cheese", can run up to as much as 15%. Additionally, cheese ripened in this manner loses no moisture during ripening which is, in particular, of economic advantage.

However, a disadvantage of foil-ripening is that, due to the different ripening conditions, the cheese also undergoes a different type of ripening process. With this different type of ripening, the development of flavor lags. Merely increasing the ripening temperature to 12-14° C. as used in standard, natural ripening is no option, since in that case a bitter flavor develops. Additionally, ripening a cheese in foil at those temperatures produces a product having an undesired consistency. Typically, the structure or texture of such cheese is experienced as being either too sandy or too soft. Thus, foil ripening is unsuitable for traditionally ripening of hard or semi-hard cheeses.

Given the consumer's ever increasing preference for the taste and structure of naturally ripened cheeses, the present inventors sought to improve the natural ripening process. More in particular, they aimed at developing a natural semi-hard or hard cheese of cylindrical shape which can essentially be cut and sliced as easily as a foil-ripened cheese while not sacrificing the desired organoleptic properties of the cheese. Ideally, the thickness of the dried, dark zone of the cheese is reduced as compared to conventionally ripened natural cheeses, e.g. to less than 6 mm, preferably less than 5 mm. Moreover, the method should be easy to use and suitable for large scale industrial application.

SUMMARY OF THE INVENTION

It was surprisingly found that the aforesaid goals could be met by tightly enclosing the circumference of the cylindrical (disk-shaped) coated cheese with a second, water-impermeable coating layer such that, during ripening, water evaporation from the cheese at areas that are not in contact with the storage shelves is minimized. In a first embodiment the second coating layer can be applied as a water-impermeable wax layer. In an alternative embodiment, the second coating layer is applied as sleeve which is sufficiently stretched to receive the cylindrical cheese, after which the sleeve is released to securely fit and enclose the circumference and curved "shoulder" area of the cheese. In both embodiments the flat top and bottom surface remain uncovered by the second coating layer.

The invention also relates to a naturally ripened, cylindrically shaped, coated cheese of the hard or semi-hard type, wherein the convex, circumferential sides and the curved area are covered with a further coating of a water-impermeable material and wherein the flat bottom surface and top surface are uncovered.

DETAILED DESCRIPTION

Accordingly, the invention relates to a method for providing a naturally ripened, cylindrically shaped cheese of the hard or semi-hard type, comprising the steps of:

(i) forming a cylindrically shaped cheese from a curd by conventional means;
(ii) applying a protective water-permeable coating layer onto the entire surface of the cheese, thereby obtaining a coated cheese;
(iii) partially enclosing the coated cheese with a further coating of a water-impermeable material such that the convex, circumferential sides and the curved area are covered while leaving the flat bottom and top surfaces uncovered, thereby obtaining a partially enclosed coated cheese; and
(iv) allowing the partially enclosed coated cheese to ripen.

Step (i) comprises the formation of a cylindrically-shaped (also sometimes referred to as wheel-shaped) cheese from a curd by conventional means, typically involving providing a conventional curd by inoculating a cheese making media with an acid-producing microorganism to form a coagulum, cutting the coagulum to provide curd and whey, and separating the curd from the whey; pressing and packing the curd into a cylindrical shape followed by transfer to a brine. As used herein, the term "cylindrical cheese" or "cylindrically shaped cheese" refers to a flattened cheese with convex sides, curving smoothly into the flat top and bottom. Typically, the height is a quarter to a third of the diameter.

After the cheese is formed, a conventional water-permeable (plastic) coating layer is applied in step (ii) onto the entire surface of the cheese to offer surface protection against yeasts and moulds during cheese ripening. For example, a liquid coating comprising polyvinyl acetate (PVA) is applied directly to the surface of the whole cheese at the start of maturation. Such conventional PVA coatings are typically applied by applying PVA-based aqueous dispersions onto the cylindrically-shaped cheese surface. The cheese subsequently passes through a coating machine with rotating flaps, which spread the dispersion evenly upon the flat circular surfaces and the convex circumferential side parts. Upon drying, a coherent plastic film is formed that offers a protective coating against mechanical damage and reduces moisture evaporation to some extent. Nevertheless, it is important that he cheese can lose moisture during the natural ripening and some moisture, therefore, should be able to evaporate from the cheese through the coating. After a few days of ripening a second uniform water-permeable coating may be applied on the side and parts of the cheese not facing the shelf on which it lies for ripening, typically by painting PVA or some other suitable water permeable coating material onto the cheese. Once dried, the cheese is turned and the now upwardly facing side of the cheese is provided with a second water permeable protective coating which is allowed to dry before the cheese is turned again. This process may repeated several times during ripening. The protective coating may contain color and/or antifungal agent, such as natamycin. Suitable conventional coating materials are also disclosed in EP-A-2 186 417.

In step (iii) of the method of the invention the coated cheese obtained in step (ii) is partially enclosed with a further coating of a water-impermeable material such that the convex, circumferential sides and the curved area are covered while leaving the flat bottom and top surfaces uncovered. The resulting partially enclosed coated cheese is subsequently allowed to further ripen in step (iv). Due to the further coating applied, any moisture evaporating from the ripening cheese can now only leave the cheese through that part of the cheese surface which is not covered by this further coating and which is not in contact with the shelf on which the cheese is stored during ripening. As a result, less moisture will leave the cheese and the thickness of the dried, dark zone of the cheese which is observed in conventionally ripened natural cheeses is reduced significantly, thereby facilitating cutting and slicing of the cheese.

Depending on the desired effect, the further coating layer can be applied directly after brining or at any other time point during the ripening process. For a young cheese, it may suitably be applied after 2 weeks following brining. For a more mature cheese, the further coating can be applied later e.g. after 4, 8, 12 or 24 weeks, preferably after 4, 6 or 8 weeks by which time sufficient crust has formed. The time period during which the cheese is partially enclosed by the further coating can vary according to specific circumstances, like the type of cheese, the ripening conditions and/or the desired degree of maturation. In one embodiment, the further coating is present during at least 4 weeks of ripening, preferably 5, more preferably 6 weeks of ripening. It can remain present as long as desired, e.g. up to 16 weeks of ripening or even longer.

The materials used for the further coating should be water-impermeable, thereby preventing moisture to leave the cheese where such further coating is applied. In one embodiment the further coating is a layer of wax. In principle any wax that is impermeable and can be applied onto cheese can be used. Such waxes are known in the art and include paraffin wax and cheese wax. Suitable materials are also disclosed in EP-A-0 2186 417 and include mono- and diglycerides having a melting temperature above 30° C., acetylated mono- and/or diglycerides and mixtures of one or more of these. An example of a suitable cheese wax are Paradip™ waxes, such as Paradip™ NW yellow 5990, Paradip Nowax™ and Paradip™ KS1/KS2.

The wax coating layer can be applied by any suitable method. For example, step (iii) may comprise contacting the convex, circumferential sides and the curved area of the cylindrically shaped coated cheese with liquid wax and drying the wax. More specifically, such contacting with liquid wax can be performed by vertically rotating the cylindrically shaped coated cheese such that its convex, circumferential sides and the curved area are passed through a bath of liquid wax. The liquid wax can be subsequently allowed to dry, either by enforced cooling or by unenforced cooling.

The amount of wax to be applied as the wax coating layer may vary within wide limits. However, it was found that good results are obtained when using an amount of wax on that part of the cheese to be coated with the further coating layer in the range of from 20 to 100 milligrams of wax per square centimeter of cheese ($mg/cm^2$), suitably 30 to 90 $mg/cm^2$, more suitably 40 to 80 $mg/cm^2$ and most suitably 50 to 70 $mg/cm^2$.

In another embodiment of the present invention the further coating is a sleeve of an elastic water-impermeable material such that the convex, circumferential sides and the curved area are covered while the flat bottom and top surfaces are left uncovered. As used herein, the term "sleeve" refers to a tubular piece of an elastic water-impermeable material.

The elastic material for use in the present invention is able to resume its normal shape spontaneously after being stretched or compressed. Compared to when using shrink film, the elastic film is easy to apply and it encloses the cheese perfectly. Shrink film does not form a tight fit around the band. Instead, it gives rise to local imperfections (rims) in the surface. A perfect fit ensures that no air is trapped in between the cheese and the film, thus avoiding growth of undesirable micro-organisms, e.g. an active mold surface developing.

In a preferred embodiment, the elastic water-impermeable material has an elongation percentage of 2 to 20%, preferably 2-10%. Of particular interest for practicing the invention is the same sort of plastic film that is used to pack and decorate bottles. Highly preferred film materials include polyethylene (PE), polypropylene (PP), polyvinylchloride (PVC) and combinations of those materials. In a specific aspect, the film material is polyethylene.

The elastic water-impermeable material preferably has a thickness in the range of 50-250 µm, preferably 80-150 µm, more preferably about 90-110. Very good results were obtained using a thickness of 100 µm.

A person skilled in the art will understand that the actual dimensions or size of the sleeve will depend on the dimensions of the cheese to which it is to be applied. At any rate, the height of the sleeve must be sufficient to, once it is applied, cover the shoulder area of the cheese. For the standard size, industrial cheeses, this is typically in the range of about 100 to about 135 mm, for example 110-125 mm. Likewise, the length/periphery of the sleeve will depend on the circumference of the cheese to be treated. Typically, it is in the range of 850-1000 mm. In a specific aspect, the sleeve is about 120 mm high and about 940 in its periphery.

The cheese can be partially enclosed by the sleeve using methods known in the art. In one embodiment, step (iii) comprises distending a force to the sleeve to temporarily stretch the sleeve to a size which corresponds to the dimensions of the cheese, followed by introducing the cheese into the stretched sleeve and then relieving the distending force. Distending a force to the elastic sleeve suitably comprises the use of an apparatus or device intended for such purposes, for example by the pushing apart of multiple metal jaws. The cheese surface can be made slippery by wetting to facilitate introducing the cheese into the stretched sleeve.

If desired, the sleeve may be provided with a decoration, preferably a printed decoration e.g. a colored logo. The decoration can be provided either on the side facing the cheese or facing away from the cheese. In one embodiment, it is facing away from the cheese. In the latter case, the decoration can be applied to the sleeve prior to or after partially enclosing a cheese with the sleeve.

Step (iv) of a method provided herein comprises allowing the partially enclosed cheese to ripen in the conventional way, typically by exposure to air.

The partial enclosure by a further water-impermeable coating layer, such as a wax layer or an elastic, water-impermeable sleeve can significantly prevent the weight loss during cheese ripening. For example, it can result in a weight loss of less than 4%, preferably less than 3%, during a ripening period of about 6 weeks, or less than 5%, preferably less than 4%, during a ripening period of about 8 weeks.

The invention also provides a naturally ripened, cylindrically shaped, coated cheese of the hard or semi-hard type, wherein the convex, circumferential sides and the curved area are covered with a further coating of a water-impermeable material and wherein the flat bottom and top surfaces are uncovered, meaning that they are not covered by the further coating. Such cheese can be obtained using a method of the invention.

The concept of the present invention is applicable to any type of cylindrical cheese. Accordingly, the present invention is suitably applied for full fat cheeses, notably 48+-cheese, such as Gouda cheese. However, its advantages are most pronounced for a low fat cheese, preferably a 30+-cheese made from skimmed or semi-skimmed milk. For example, in one embodiment the invention relates to a naturally ripened, cylindrical cheese of Milner type or any similar cheese characterized by less fat and full flavor, with only a minimal dried, dark zone at the circumference of the cheese.

The invention is further illustrated by the following examples without limiting the invention to these specific embodiments.

DESCRIPTION OF THE DRAWINGS

FIG. 1A: 48+ cheese. FIG. 1B: 30+ cheese of the Milner type.

EXAMPLES

Example 1—Elastic Sleeve

Semi-hard cylindrical cheeses of about 36 cm in diameter, a height of about 11 cm and a weight of about 12 kg of the type 30+ and 48+ were ripened at a temperature of 13° C. at a relative humidity of 85%.

During the test period, the cheeses were turned each day, after which the top surface was provided with a conventional thin layer of water-permeable cheese polyvinyl acetate (PVA) coating.

At the age of 4 weeks following brining, the test cheeses were provided with an elastic, water impermeable sleeve made of polyethylene, a height of 120 mm, a periphery of 940 mm and having a thickness of about 100 µm such that the convex, circumferential sides and the curved area are covered while leaving the flat bottom and top surfaces uncovered. Two reference cheeses were allowed to ripen in the standard fashion without the partial enclosure by a sleeve.

The cheeses were weighed each week to determine the percentage of weight loss caused by evaporation.

Figure 1A:
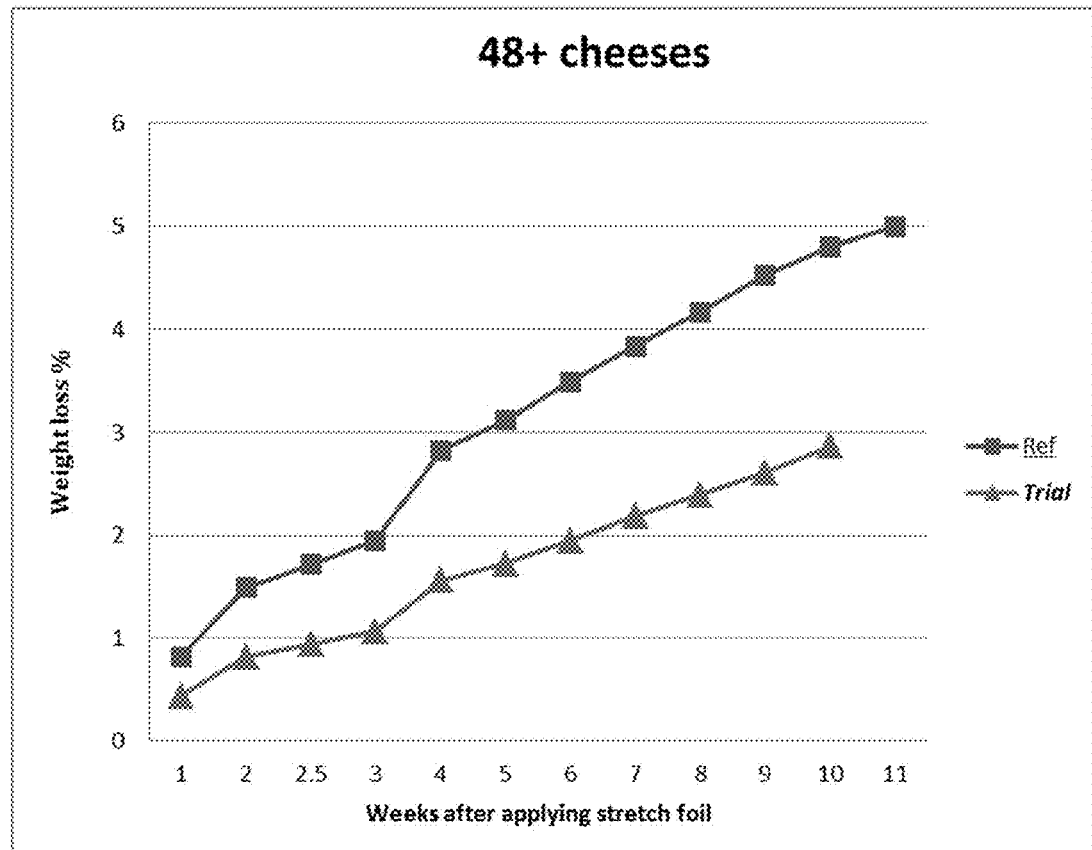
FIGS. 1A and 1B: Percentage weight loss during ripening of cheeses partially enclosed by an elastic sleeve (filled triangles; Trial) or not (filled squares; Ref.).
Figure 1B:
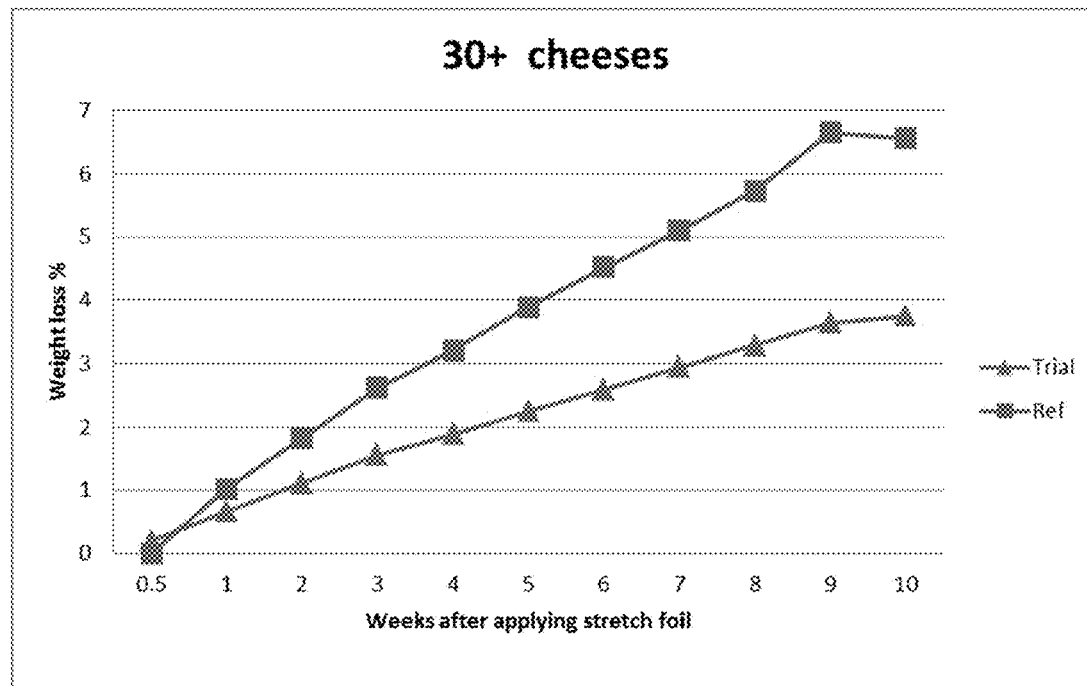

FIG. 1 clearly shows that application of the sleeve drastically reduces the weight loss for both the 48+(panel A) and 30+(panel B) cheeses. For example, for the sleeved cheeses, the weight reduction after 4 weeks was 1-1.5% less as compared to the non-sleeved cheeses. This was accompanied by a reduced thickness of the dried, dark zone in the band area. Herewith, the band area remains supple and elastic and the cheese is more attractive for the consumer.

Example 2—Wax Coating of Milner 30+ Cheese

At the age of 4 weeks following brining the convex, circumferential sides and the curved area of 12 kg 30+ Milner test cheeses were covered with circa 59 grams of a water impermeable formulated cheese wax based on acetoglycerides (Paradip Nowax), while leaving the flat bottom and top surfaces uncovered. This corresponded with an amount of wax on the coated circumferential side of the cheese of about 60 mg/cm$^2$. As reference the same cheeses were allowed to ripen in the standard fashion without the partial enclosure by the wax ("reference cheeses").

During the test period, the cheeses were turned every 3 to 4 days, after which the top surface was provided with a conventional thin layer of water-permeable polyvinyl-acetate cheese coating.

Figure 2:
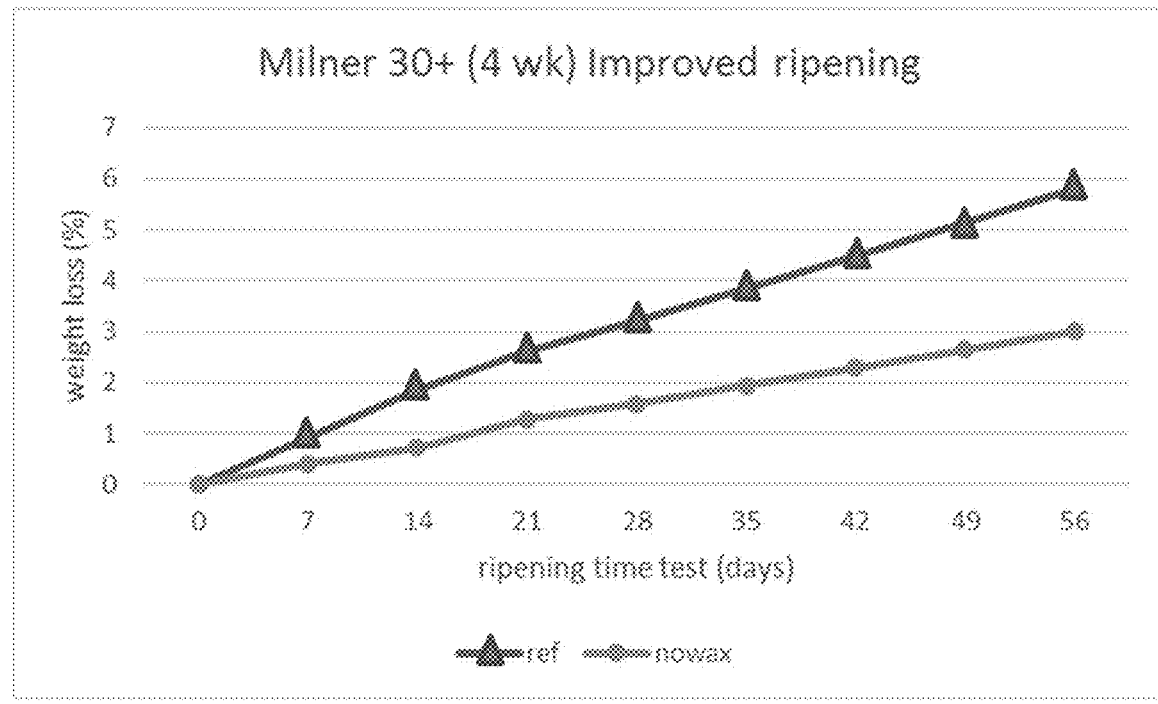
FIG. 2: Percentage weight loss during ripening of 30+ cheeses partially enclosed by a wax coating (dots: according to invention) or not (filled triangles: reference).

The cheeses were weighted each week to determine the percentage of weight loss caused by evaporation. The loss of weight in time is plotted in FIG. 2. From this FIG. 2 it can be seen that the reference cheese loses more weight during ripening than the cheese with the wax coating, indicating that more moisture evaporates through the side of the reference cheese than is the case for the cheese with the wax coating.

At the end of the ripening period (42 days and 56 days) the reference cheeses and the cheeses with the wax coating in accordance with the invention were cut into halves to view the thickness and darkness of the dried, darker zone in the band area. Visual inspection showed a thinner, lighter coloured zone for the cheeses ripened in accordance with the present invention (i.e. with the wax coating layer) as compared with the reference cheeses for both the ripening period of 42 days and the ripening period of 56 days.

Example 3—Wax Coating of Gouda 48+ Cheese

Example 2 was repeated with Gouda 48+ cheese except that the convex, circumferential sides and the curved area of the Gouda 48+ test cheeses were coated 2 weeks after brining with 66 grams of Paradip Nowax wax, corresponding with an amount of wax on the coated circumferential side of the cheese of about 60 mg/cm$^2$.

Figure 3:
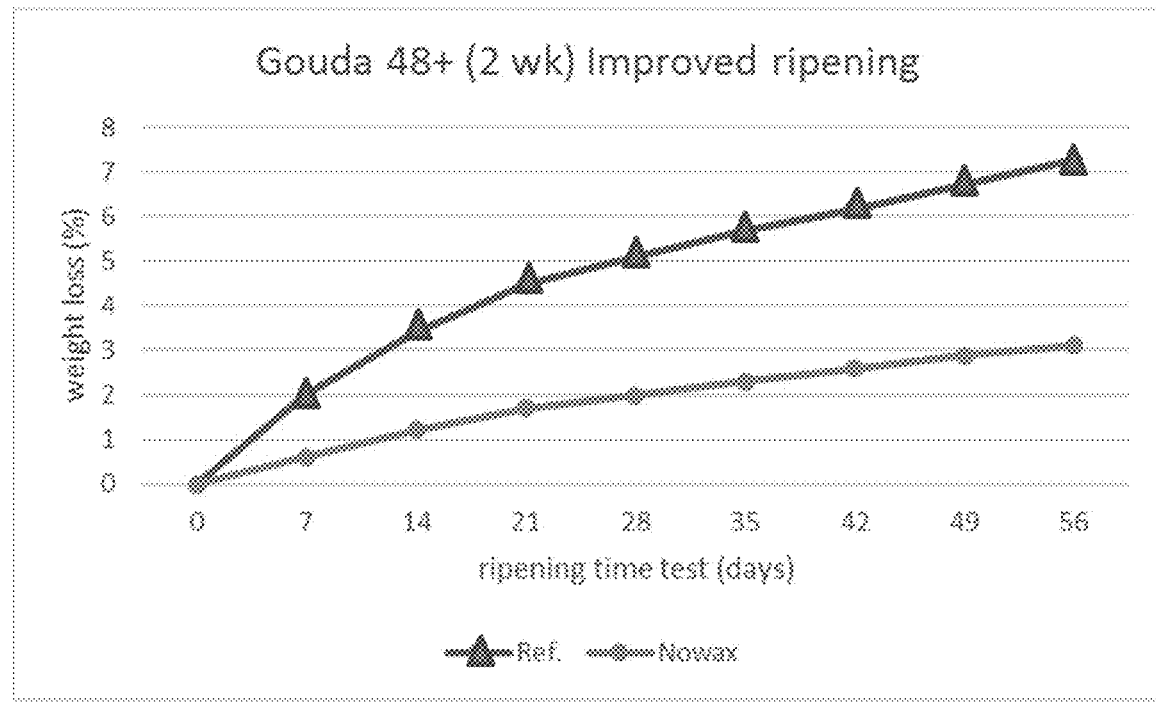
FIG. 3: Percentage weight loss during ripening of 48+ cheeses partially enclosed by a wax coating (dots: according to invention) or not (filled triangles: reference).

The loss of weight in time is plotted in FIG. 3. FIG. 3 clearly shows that the reference cheese loses more weight during ripening than the cheese with the wax coating, indicating that more moisture evaporates through the side of the reference cheese than is the case for the cheese with the wax coating.

At the end of the ripening period (49 days) the reference cheese and the cheese with the wax coating in accordance with the invention were cut into halves to view the thickness and darkness of the dried, darker zone in the band area. Visual inspection showed a thinner, lighter coloured zone for the cheese ripened in accordance with the present invention (i.e. with the wax coating layer) as compared with the reference cheese.

The invention claimed is:

1. A method for providing a naturally ripened, cylindrically shaped cheese having a rind, the method comprising, sequentially:
   (i) forming from curd a cylindrically shaped cheese having convex, circumferential sides, a curved area, a flat bottom surface and a flat top surface;
   (ii) brining the cheese;
   (iii) applying a protective water-permeable coating layer onto the entire surface of the cheese, thereby obtaining a coated cheese;
   (iv) partially enclosing the coated cheese with a further coating of a water-impermeable material such that the convex, circumferential sides and the curved area are covered, while leaving the flat bottom surface and flat top surface uncovered, thereby obtaining a partially enclosed coated cheese; and
   (v) allowing the partially enclosed coated cheese to ripen, thereby obtaining the naturally ripened, cylindrically shaped cheese having the rind.

2. The method according to claim 1, wherein the partial enclosing (iv) is carried out at least 2 weeks after applying the protective water-permeable coating layer (iii).

3. The method according to claim 2, wherein the partial enclosing (iv) is carried out at least 4 weeks after applying the protective water-permeable coating layer (iii).

4. The method according to claim 1, wherein the further coating comprises a layer of wax.

5. The method according to claim 4, wherein the partial enclosing (iv) comprises contacting the convex, circumferential sides and the curved area of the cylindrically shaped coated cheese with liquid wax and drying the wax.

6. The method according to claim 5, wherein the contacting with liquid wax is performed by vertically rotating the cylindrically shaped coated cheese such that its convex, circumferential sides and the curved area are passed through a bath of liquid wax.

7. The method according to claim 1, wherein the further coating is a sleeve of an elastic water-impermeable film material.

8. The method according to claim 7, wherein the elastic water-impermeable film material is selected from the group consisting of polyethylene, polypropylene and polyvinylchloride.

9. The method according to claim 8, wherein the partial enclosing (iv) comprises applying a distending force to the sleeve of elastic water-impermeable material to temporarily stretch the sleeve to a size which corresponds to the circumferential sides of the cheese, introducing the cheese into the stretched sleeve, and relieving the distending force.

10. The method according to claim 1, wherein the naturally ripened cheese is a hard cheese.

11. The method according to claim 1, wherein the naturally ripened cheese is a semi-hard cheese.

12. The method according to claim 1, wherein the forming (i) comprises:
    (a) inoculating a cheese making media with an acid-producing microorganism to form a coagulum,
    (b) cutting the coagulum to provide curd and whey,
    (c) separating the curd from the whey; and/or
    (d) pressing and packing the curd into the cylindrical shape.

13. The method according to claim 1, wherein the protective water-permeable coating layer comprises polyvinyl acetate (PVA).

14. The method according to claim 1, wherein the cheese of (v) is allowed to ripen at about 13 to 18° C. at a relative humidity of 70 to 80%.

* * * * *